2,838,536

6-FLUORO 9α-HALO-Δ⁴-PREGNENES AND PROCESS FOR PREPARING SAME

Barney J. Magerlein, Kalamazoo, and George B. Spero, William P. Schneider, and John A. Hogg, Kalamazoo Township, Kalamazoo County, Mich., assignors to The Upjohn Company, Kalamazoo, Mich., a corporation of Michigan No Drawing. Application November 29, 1957
Serial No. 699,498

23 Claims. (Cl. 260—397.45)

This invention relates to 6-fluoro-9α-halo-21-desoxy-hydrocortisone and 6-fluoro-9α-halo-21-desoxycortisone and is more particularly concerned with 6α,9α-difluoro-21-desoxyhydrocortisone (6α,9α-difluoro-11β,17α-dihydroxy-4-pregnene-3,20-dione), 6α,9α-difluoro - 21 - desoxycortisone (6α,9α-difluoro-17α-hydroxy-4-pregnene-3,11,20-trione), and to processes for the production thereof.

The compounds of this invention, 6-fluoro-9α-halo-21-desoxyhydrocortisone and 6-fluoro-9α-halo-21-desoxycortisone, possess valuable anti-rheumatoid arthritic, anti-inflammatory and glucocorticoid activities in marked degree. Thus, for example, 6α,9α-difluoro-21-desoxyhydrocortisone has been found to exhibit approximately twenty-three times the glucocorticoid activity of hydrocortisone, approximately twelve times the anti-inflammatory activity of hydrocortisone, and in addition has a favorable effect on salt and water balance. These compounds are useful in the treatment of inflammatory conditions of the skin, eyes and ears of humans and of valuable domestic animals, as well as contact dermatitis and other allergic reactions. Administration of the novel steroids can be in conventional dosage forms, such as pills, tablets, capsules, syrups or elixirs for oral use, or in liquid forms which are adaptable to the natural and synthetic cortical steroid hormones for injectable products. The novel compounds can also be administered topically in the form of ointments, creams, lotions and the like, with or without coacting antibiotics, germicides or other materials forming advantageous combinations therewith.

The compounds of this invention can be prepared in accordance with the following reactions:

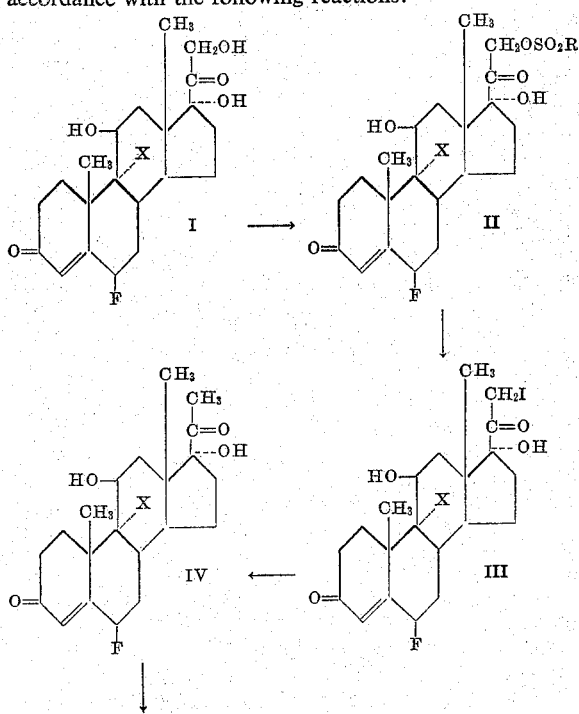

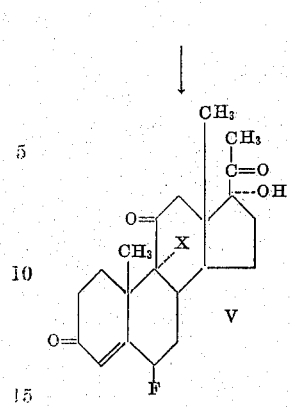

wherein X is a halogen of atomic weight between seventeen and eighty, inclusive, i. e., fluorine, chlorine, or bromine and wherein R is an organic radical, particularly a hydrocarbon radical containing from one to ten carbon atoms, inclusive, such as methyl, ethyl, phenyl, tolyl, naphthyl, or the like, methyl being preferred.

It is an object of the present invention to provide 6-fluoro-9α-halo-21-desoxyhydrocortisone (IV) and 6-fluoro-9α-halo-21-desoxycortisone (V). Another object of this invention is to provide 6α,9α-difluoro-21-desoxyhydrocortisone and 6α,9α-difluoro-21-desoxycortisone. A further object is to provide a process for the production of 6-fluoro-9α-halo-21-desoxyhydrocortisone and 6-fluoro-9α-halo-21-desoxycortisone. An additional object is to provide a process for the production of 6α,9α-difluoro-21-desoxyhydrocortisone and 6α,9α-difluoro-21-desoxycortisone.

The process of the present invention comprises treating a 6-fluoro-9α-halo-11β,17α,21-trihydroxy-4-pregnene-3,20-dione (6-fluoro-9α-halohydrocortisone) (I) with an organic sulfonyl halide to obtain the corresponding 21-ester (II), a 21-alkyl or aryl sulfonate of 6-fluoro-9α-halo-11β,17α,21-trihydroxy-4-pregnene-3,20 - dione, and thereafter treating the thus produced 21-alkyl or aryl sulfonate with an iodinating agent, such as sodium iodide in acetone solution, to obtain the corresponding 6-fluoro-9α-halo-21-iodo-11β,17α-dihydroxy-4-pregnene - 3,20 - dione (III) and, finally, treating the thus produced 6-fluoro-9α-halo-21-iodo-11β,17α-dihydroxy-4-pregnene - 3,20 - dione with a reducing agent, such as zinc dust, sodium thiosulfate, sodium bisulfite, potassium bisulfite, or the like, preferably in an aqueous organic solvent mixture, to obtain 6-fluoro-9α-halo-11β,17α-dihydroxy-4-pregnene-3,20-dione (IV). If desired, the 6-fluoro-9α-halo product IV above can be oxidized to give the corresponding 6-fluoro-9α-halo-17α-hydroxy-4-pregnene - 3,11,20 - trione (VI). Moreover, when the 11-keto analogue (6-fluoro-9α-halo-17α,21-dihydroxy-4-pregnene-3,11,20-trione) is utilized as starting material in the above series of reactions, 6-fluoro-9α-halo-17α-hydroxy-4-pregnene-3,11,20-trione (V) is produced directly without the necessity for oxidation of the 11β-hydroxyl as the final step.

The starting steroids for the compounds and process of the present invention are 6-fluoro-9α-halohydrocortisone and 6-fluoro-9α-halocortisone and are prepared in accordance with the procedures of Preparations 1 through 18 herein. The preferred compounds containing the 17(20)-double bond have the cis configuration because they are convertible in higher yields in the oxidative hydroxylation step than are the trans isomers, although both are operative.

In carrying out the process of this invention, 6-fluoro-9α-halohydrocortisone is treated with an organic sulfonyl halide such as methanesulfonyl chloride, toluenesulfonyl chloride, toluenesulfonyl bromide, benzenesulfonyl chloride, naphthylsulfonyl chloride, or the like, the methanesulfonyl acid halides, especially methanesulfonyl chloride, being preferred. In the preferred embodiment of this invention, the starting steroid is usually reacted with the alkyl or aryl sulfonyl halide in solution in a solvent such as pyridine, benzene, toluene, or the like. Where such solvents as benzene and toluene are employed, an amount of an amine base such as pyridine at least equal to the molar amount of the sulfonyl halide should also be present to react with the hydrochloric acid formed. Reaction of the alkyl or aryl sulfonyl halide is conducted preferably at temperatures between minus ten and plus sixty degrees centigrade, provided that at the lower temperatures the solvent has not solidified. Thus, for pyridine, dioxane, toluene, or the like, temperatures in the range of zero to ten degrees centigrade can be used, while for benzene only temperatures above five degrees centigrade are suitable because of the relatively high freezing point of benzene. The reaction time is usually between about four to 24 hours, after which the product, 6-fluoro-9α-halo-11β,17α,21-trihydroxy-4-pregnene-3,20-dione 21-alkyl or aryl sulfonate (II), is recovered in a conventional manner, such as, for example, by evaporating the solvent until a solid residue is obtained or by diluting the reaction mixture with water and precipitating the product with dilute hydrochloric acid.

The 6-fluoro-9α-halo-11β,17α,21-trihydroxy - 4 - pregnene-3,20-dione 21-alkyl or aryl sulfonate is converted to the corresponding 21-iodo compound (IV) by reacting the said 21-alkyl or aryl sulfonate with an iodinating agent, such as an alkali metal iodide, e. g., sodium, potassium or lithium iodide, in an oxygenated hydrocarbon solution such as an alkanone solution, e. g., acetone. A molar excess of the iodide (three to twenty moles of iodide per mole of steroid) is generally preferred for this reaction. The reaction mixture containing the 21-alkyl or aryl sulfonate and the alkali metal iodide in solution is heated to reflux for a period of about three minutes to thirty minutes. The thus produced 6-fluoro-9α - halo - 21 - iodo - 11β,17α - dihydroxy - 4 - pregnene 3,20-dione can then be isolated by evaporating the solvent. For the subsequent reaction, the 21-iodo steroid can be used either in purified form as a product of recrystallization from such organic solvents as acetone, ethanol, or the like, or it can be employed directly as a crude product in the next step of the synthesis.

In order to obtain 6-fluoro-9α-halo-11β,17α-dihydroxy-4-pregnene-3,20-dione, the crude 6-fluoro-9α-halo-11β,-17α-dihydroxy-21-iodo-4-pregnene-3,20-dione is reacted with a reducing agent such as sodium or potassium thiosulfate, sodium bisulfite or zinc dust in acetic acid. In the preferred embodiment of the invention the 21-iodo compound is dissolved in acetic acid at room temperature and stirred from about thirty minutes to one hour. Excess aqueous sodium thiosulfate is added, followed by ice and water. The time of reaction is not critical and is generally between a few minutes and several hours. The amount of sodium thiosulfate may be varied so long as an excess is used. The product, 6-fluoro-9α-halo-11β,-17α-dihydroxy-4-pregnene-3,20-dione, is obtained by conventional means such as recrystallization or extraction and thereafter recrystallization or chromatography as deemed necessary.

The foregoing reactions can likewise be conducted on the corresponding 11-keto analogues.

The oxidation of 6-fluoro-9α-halo-11β,17α-dihydroxy-4-pregnene-3,20-dione can be carried out by a variety of methods, such as, for example, by oxidizing the said 6,21-difluoro steroid in acetic acid solution with chromium trioxide, using molar quantities or a slight excess, such as from ten to thirty percent excess, or by oxidizing with a haloamide or imide of an acid, such as N-bromoacetamide, N-chlorosuccinimide, or N-bromosuccinimide dissolved in pyridine, dioxane, or other suitable solvents. At the conclusion of the desired oxidation reaction, the excess oxidant is generally destroyed by the addition of methyl alcohol, ethyl alcohol, and the like for the chromic acid oxidant, or a bisulfite for N-bromoacetamide, N-bromosuccinimide and other N-halo acyl amides and imides. Thereafter, the resulting 6-fluoro-9α-halo-17α-hydroxy-4-pregnene-3,11,20-trione is recovered by conventional means, such as by extraction with water-immiscible solvents, e. g., methylene chloride, ether, benzene, toluene or the like, or by chromatography.

The order of steps for the preparation of the products of the present invention are susceptible of variation without departing from the basic concepts of the process. As shown in Preparations 12 through 15, 6-fluorohydrocortisone 21-acetate is converted to 6-fluoro-9α-halohydrocortisone by the introduction of the 9α-halogen. The 6-fluoro-9α-halohydrocortisone is then converted to 6-fluoro-9α-halo-21-desoxyhydrocortisone as shown in the examples. Alternatively, if desired, removal of the oxygen at carbon atom 21 can be accomplished first, and this can be followed by halogenation at carbon atom 9. Thus by treating 6-fluorohydrocortisone with an organic sulfonyl halide to obtain the corresponding 21-ester, a 21-alkyl or aryl sulfonate of 6-fluoro-11β,17α,21-trihydroxy-4-pregnene-3,20-dione, and thereafter reacting the thus produced 21-alkyl or aryl sulfonate with an alkali metal iodide in acetone solution to obtain the corresponding 6-fluoro-11β,17α-dihydroxy-21-iodo-4-pregnene-3,20-dione, and finally treating the thus produced 21-iodo compound with a reducing agent such as sodium thiosulfate, sodium bisulfite, potassium bisulfite, zinc dust, or the like in an aqueous organic solvent mixture, there is obtained 6-fluoro-11β,17α-dihydroxy-4-pregnene-3,20-dione (6-fluoro-21-desoxyhydrocortisone). This product can be dehydrated with N-bromoacetamide and anhydrous sulfur dioxide in pyridine solution by permitting the reaction to continue until a negative acidified potassium iodide-starch test of the reaction mixture is obtained. Dilution with cold water results in the precipitation of 6-fluoro-17α-hydroxy-4,9(11)-pregnadiene-3,20-dione, which can be purified by recrystallization from acetone. The crystalline product can then be reacted in methylene chloride-tertiary butyl alcohol solution with perchloric acid and N-bromoacetamide or N-iodosuccinimide to produce a reaction mixture from which 6-fluoro-9α-bromo-11β,17α-dihydroxy-4-pregnene-3,20-dione or the corresponding 6-fluoro-9α-iodo compound can be recovered by precipitation with ice water and recrystallization from acetone. The latter steroids can then be reacted in acetone solution with anhydrous potassium acetate at reflux temperatures to produce 6-fluoro-9,11-oxido-17α-hydroxy-4-pregnene-3,20-dione, which is recoverable from the reaction mixture by chromatography and can be further purified by recrystallization from Skellysolve B hexanes-acetone. Reaction of the said 9,11-oxido compound in methylene chloride solution with aqueous hydrogen fluoride or hydrogen fluoride gas in the presence of tetrahydrofuran at room temperature is productive of 6,9α-difluoro-11β,17α-dihydroxy-4-pregnene-3,20-dione. Substitution of aqueous hydrogen chloride for the hydrogen fluoride above yields 6-fluoro-9α-chloro-11β,17α-dihydroxy-4-pregnene-3,20-dione. If desired, either the 9α-fluoro or chloro product can be oxidized, for example, with chromic acid in acetic acid solution to give 6,9α-difluoro-17α-hydroxy-4-pregnene-3,11,20-trione or the corresponding 9α-chloro compound.

In the foregoing processes, it should be understood that the corresponding 6β-halo epimer can be utilized at any stage and the 6α-epimer obtained at appropriate intermediate stages by treatment of the 6β-compound, at temperatures of zero degrees centigrade or slightly lower, in an organic solvent such as chloroform and in the presence of alcohol, with an anhydrous mineral acid, such as hydrochloric acid. The reduced temperatures should be maintained throughout the period of addition of the acid. The reaction mixture can then be washed with successive portions of dilute alkali and water and evaporated under reduced pressure to obtain the 6α-epimer in high yield.

The following preparations and examples are illustrative of the process and products of the present invention but are not to be construed as limiting.

PREPARATION 1

*3-ethylene ketal of methyl 3,11-diketo-5α,6α-oxido-17(20)-[cis]-pregnen-21-oate*

To a solution of five grams of the 3-ethylene ketal of methyl 3,11-diketo-4,17(20)-[cis]-pregnadien-21-oate, prepared in the manner described in U. S. Patent 2,707,184, in 100 milliliters of chloroform was added a chilled solution of 1.9 grams of perbenzoic acid dissolved in 31.5 milliliters of chloroform. The solution was maintained at about four degrees centigrade for 24 hours, and then at room temperature for 72 hours. The solution was washed with a five percent aqueous solution of sodium bicarbonate and then with water. The chloroform layer was separated, dried and the solvent distilled to give a residue of 5.3 grams of solid. Crystallization of this solid from methanol gave 2.24 grams of product melting at 180 to 195 degrees centigrade, and after two crystallizations from methanol there was obtained pure 3-ethylene ketal of methyl 3,11-diketo-5α,6α-oxido-17(20)-[cis]-pregnen-21-oate melting at 206 to 209 degrees centigrade and having an $[\alpha]_D$ of plus 37 degrees (CHCl$_3$) and the following analysis:

Calculated for $C_{24}H_{32}O_6$: C, 69.20; H, 7.75. Found: C, 69.59; H, 7.81.

PREPARATION 2

*Methyl 3,11-diketo-5α,6β-dihydroxy-17(20)-allopregnen-21-oate and methyl 3,11-diketo-5α-hydroxy-6β-fluoro-17(20)-allopregnen-21-oate*

To a solution of 1.73 grams of 3-ethylene ketal of methyl 3,11-diketo-5α,6α-oxido-17(20)-[cis]-pregnen-21-oate in sixteen milliliters of methylene chloride was added six milliliters of 48 percent hydrofluoric acid. The heterogeneous mixture was stirred for two hours, made slightly basic with 300 milliliters of five percent sodium bicarbonate solution, and extracted with methylene chloride. The extract was washed, dried, and evaporated to dryness to give 1.62 grams of crude solid. Purification by chromatography gave two fractions: A, 481 milligrams eluted with methylene chloride plus five percent acetone, and B, 921 milligrams eluted with methylene chloride plus ten and twenty percent acetone. Crystallization of fraction A from acetone-Skellysolve B hexanes gave 390 milligrams of methyl 3,11-diketo-5α-hydroxy-6β-fluoro-17(20)-allopregnen-21-oate, melting point 254 to 260 degrees centigrade. The analytical sample melted at 260 to 263 degrees centigrade.

*Analysis.*—Calculated for $C_{22}H_{29}O_5F$: F, 4.84. Found: F, 4.47.

Fraction B on crystallization from acetone-Skellysolve B hexanes gave 470 milligrams of methyl 3,11-diketo-5α,6β-dihydroxy-17(20)-allopregnen-21-oate, melting point 235 to 245 degrees centigrade. The analytical sample melted at 245 to 248 degrees centigrade.

*Analysis.*—Calculated for $C_{22}H_{30}O_6$: C, 67.67; H, 7.74. Found: C, 67.91; H, 7.62.

PREPARATION 3

*Methyl 3,11-diketo-5α-hydroxy-6β-fluoro-17(20)-allopregnen-21-oate 3-ethylene ketal*

A mixture of 1.9 grams of methyl 3,11-diketo-5α-hydroxy-6β-fluoro-17(20)-allopregnen-21-oate, 59 milligrams of p-toluenesulfonic acid monohydrate and 31 milliliters of distilled ethylene glycol was added to 800 milliliters of benzene. The mixture was stirred and refluxed for two hours, with the condensate passing through a water trap to remove the water. After reflux the mixture was cooled, washed with water and evaporated to dryness to give a crude solid which on recrystallization from acetone-Skellysolve B hexanes gave 1.96 grams of methyl 3,11-diketo-5α-hydroxy-6β-fluoro - 17(20) - allopregnene-21-oate 3-ethylene ketal, melting point 170 to 173 degrees centigrade.

Following the above procedure, substituting other dihydric alcohols for ethylene glycol, for example, 1,2-propylene glycol, 2,3-butanediol, 1,3-butanediol and 2,3-pentanediol, is productive of the respective 3-alkylene ketals of methyl 3,11-diketo - 5α - hydroxy - 6β - fluoro-17(20)-allopregnen-21-oate.

PREPARATION 4

*5α,11β,21-trihydroxy-6β-fluoro-17(20)-allopregnen-3-one 3-ethylene ketal*

To a solution of 1.96 grams of methyl 3,11-diketo-5α-hydroxy-6β-fluoro-17(20)-allopregnen-21-oate 3-ethylene ketal in 850 milliliters of anhydrous ether was added 3.7 grams of lithium aluminum hydride. The mixture was stirred for a period of one hour, and 200 milliliters of water was added slowly, the ether phase separating. The aqueous phase was extracted with ethyl acetate and the extracts added to the ether phase. The combined ether-ethyl acetate solution was washed with water, dried and evaporated to dryness under reduced pressure. The crude solid residue was crystallized from acetone-Skellysolve B hexanes to give 1.30 grams of 5α,11β,21-trihydroxy - 6β - fluoro - 17(20) - allopregnen-3-one 3-ethylene ketal, melting point 197 to 205 degrees centigrade. An additional 226 milligrams was obtained from the mother liquor, melting point 175 to 185 degrees centigrade.

PREPARATION 5

*5α,11β-dihydroxy-6β-fluoro-21-acetoxy-17(20)-allopregnen-3-one 3-ethylene ketal*

The acetate was prepared by allowing 0.87 gram of 5α,11β,21-trihydroxy - 6β - fluoro-17(20)-allopregnen-3-one 3-ethylene ketal to stand overnight in ten milliliters of acetic anhydride and ten milliliters of pyridine. The solution was then poured into ice water to give 0.92 gram of 5α,11β-dihydroxy-6β-fluoro-21-acetoxy-17(20)-allopregnen-3-one 3-ethylene ketal, melting point 140 to 150 degrees centigrade, which on recrystallization from acetone-Skellysolve B hexanes gave 0.77 gram, melting point 149 to 153 degrees centigrade.

Similarly, other 21-organic carboxylic esters of 5α,11β,21-trihydroxy - 6β - fluoro-17(20)-allopregnen-3-one 3-ethylene ketals can be prepared wherein the 21-acyloxy group is formyloxy, propionyloxy, butyryloxy, valeryloxy, hexanoloxy, heptanoyloxy, octanoyloxy, benzoyloxy, phenylacetoxy, or the like, by contacting 5α,11β,21-trihydroxy - 6β - fluoro-17(20)-allopregnen-3-one 3-ethylene ketal with the appropriate acylating agent, e. g., the anhydride or acid halide of the selected acid in a solvent such as benzene, toluene, acetic acid, or the like.

PREPARATION 6

*5α,11β,17α-trihydroxy-6β-fluoro-21-acetoxy-allopregnane-3,20-dione 3-ethylene ketal*

To a solution of 0.77 gram of 5α,11β-dihydroxy-6β-fluoro-21-acetoxy-17(20)-allopregnen-3-one 3 - ethylene ketal in 35 milliliters of tertiary butyl alcohol was added one milliliter of pyridine, 1.9 milliliters of N-methylmorpholine oxide peroxide solution, and 13.1 milligrams of osmium tetroxide (9.1 milliliters of tertiary butyl alcohol solution containing 1.44 milligrams of osmium tetroxide per milliliter). The solution was stirred for a period of 2.5 hours and fifteen milliliters of five percent sodium hydrosulfite was added. Stirring was continued for an additional ten minutes, at which time 0.7 gram of finely ground synthetic magnesium silicate was mixed into the solution for a period of twenty minutes and then removed by filtration. The filtrate was evaporated to dryness under reduced pressure at a temperature of less than fifty degrees centigrade. The residue was dissolved in methylene chloride, washed with water, dried and evaporated to dryness. This residue was crystallized from acetone-Skellysolve B hexanes to give 0.47 gram of 5α,11β,17α-trihydroxy-6β-fluoro-21-acetoxyallopregnane-3,20 - dione 3-ethylene ketal, melting point 220 to 228 degrees centigrade.

PREPARATION 7

5α,11β,17α-trihydroxy-6β-fluoro-21-acetoxy-allopregnane-3,20-dione

A solution of 0.47 gram of 5α,11β,17α-trihydroxy-6β-fluoro-21-acetoxyallopregnane-3,20-dione 3-ethylene ketal in 35 milliliters of acetone and four milliliters of 1N sulfuric acid solution was gently boiled on a steam bath for ten minutes, cooled and neutralized with dilute sodium bicarbonate solution. Addition of water followed by cooling gave 0.33 gram of 5α,11β,17α-trihydroxy-6β-fluoro-21-acetoxyallopregnane-3,20-dione, melting point 230 to 240 degrees centigrade.

PREPARATION 8

6β-fluoro-11β,17α-dihydroxy-21-acetoxy-4-pregnene-3,20-dione (6β-fluorohydrocortisone acetate)

A solution of 100 milligrams of 5α,11β,17α-trihydroxy-6β-fluoro-21-acetoxyallopregnane-3,20-dione in 4.9 milliliters of acetic acid and 0.1 milliliter of water was refluxed for a period of one hour, cooled, diluted with fifty milliliters of water and evaporated to dryness under reduced pressure. The residue was chromatographed over synthetic magnesium silicate to give one fraction (77 milligrams) eluted with methylene chloride plus ten percent acetone. Crystallization from acetone-Skellysolve B hexanes gave 38 milligrams of 6β-fluoro-11β,17α-dihydroxy-21-acetoxy-4-pregnene-3,20-dione (6β - fluorohydrocortisone acetate), melting point 210 to 218 degrees centigrade. Infrared data and ultraviolet data were in agreement with the structure.

PREPARATION 9

6α-fluoro-11β,17α-dihydroxy-21-acetoxy-4-pregnene-3,20-dione (6α-fluorohydrocortisone acetate)

A solution of 0.132 gram of 6β-fluoro-11β,17α-dihydroxy-21-acetoxy-4-pregnene-3,20-dione in twelve milliliters of chloroform and 0.1 milliliter of absolute alcohol was cooled to minus ten degrees centigrade in an ice-salt bath. A stream of anhydrous hydrochloric acid was gently bubbled through the solution for 2.5 hours, during which period the temperature was maintained between minus five and minus fifteen degrees centigrade. The solution was then diluted with 25 milliliters of chloroform, washed with dilute aqueous sodium bicarbonate solution, dried over anhydrous sodium sulfate, and evaporated to dryness under reduced pressure at sixty degrees centigrade. Crystallization of the residue from acetone-Skellysolve B hexanes gave 42 milligrams of the isomerized product, 6α-fluoro-11β,-17α-dihydroxy-21-acetoxy-4-pregnene-3,20-dione, which melted at 203 to 210 degrees centigrade.

PREPARATION 10

6α-fluoro-11β,17α,21-trihydroxy-4-pregnene-3,20-dione (6α-fluorohydrocortisone)

A solution of 1.1 grams of 6α-fluoro-11β,17α-dihydroxy-21-acetoxy-4-pregnene-3,20-dione, one gram of potassium bicarbonate, 100 milliliters of methanol and fifteen milliliters of water were mixed together and purged with nitrogen to remove dissolved oxygen while stirring at 25 degrees centigrade for four hours. The solution was then neutralized by addition of acetic acid and distilled under vacuum to remove the methanol. The residue was extracted with 100 milliliters of methylene dichloride, and the extract was dried over sodium sulfate and passed through a column containing eighty grams of synthetic magnesium silicate. The fraction eluted with Skellysolve B hexanes plus twenty and thirty percent acetone weighed 770 milligrams, representing a yield of 77.5 percent. Recrystallization of a portion of this crude product from ethyl acetate-Skellysolve B hexanes gave crystals melting at 192 to 195 degrees centigrade.

PREPARATION 11

6α-fluoro-17α-hydroxy-21-acetoxy-4,9(11)-pregnadiene-3,20-dione

To a solution of one gram of 6α-fluorohydrocortisone acetate in ten milliliters of pyridine was added 0.4 gram of N-bromoacetamide. The mixture was allowed to stand under nitrogen for twenty minutes, at which time it was cooled to five degrees centigrade. While stirring, sulfur dioxide was passed over the surface until the solution gave no color change with acidified starch-iodide paper. The temperature of the reaction mixture was not allowed to go above twenty degrees centigrade during the sulfur dioxide addition. The mixture was then allowed to stand for five minutes and was poured into 100 milliliters of ice-water, resulting in precipitation of 915 milligrams of crude solid, melting point 190 to 202 degrees centigrade. Crystallization from acetone gave 511 milligrams of 6α-fluoro-17α-hydroxy-21-acetoxy-4,9(11)-pregnadiene-3,20-dione melting point 214 to 218 degrees centigrade. The analytical sample melted at 220 to 222 degrees centigrade. Analysis gave $[\alpha]_D$ plus 73 degrees (acetone) and the following:

*Analysis.*—Calcd. for $C_{23}H_{29}O_5F$: C, 68.30; H, 7.23; F, 4.70. Found: C, 68.77; H, 7.57; F, 4.77.

PREPARATION 12

6α - fluoro - 9α - bromo - 11β,17α - dihydroxy - 21 - acetoxy - 4 - pregnene - 3,20 - dione (6α - fluoro - 9α-bromohydrocortisone acetate)

To a solution of 420 milligrams of 6α-fluoro-17α-hydroxy-21-acetoxy-4,9(11)-pregnadiene-3,20-dione in 6.5 milliliters of methylene chloride was added 12.5 milliliters of tertiary butyl alcohol, a solution of 1.0 milliliter of 72 percent perchloric acid in 75 milliliters of water, and a solution of 182 milligrams of N-bromoacetamide in 3.2 milliliters of tertiary butyl alcohol. After stirring for fifteen minutes, a solution of 182 milligrams of sodium sulfite in ten milliliters of water was added and the mixture concentrated under reduced pressure as sixty degrees centigrade until crystallization occurred. After cooling in an ice bath, thirty milliliters of water was added with stirring. On filtering the crystalline product, followed by washing with water and drying, a yield of 480 milligrams of essentially pure 6α-fluoro-9α-bromo-11β,17α-dihydroxy - 21 - acetoxy - 4 - pregnene - 3,20 - dione, melting point 163 to 166 degrees centigrade (with decomposition), was obtained. The product was used in the succeeding example without further purification.

Substitution of N-iodosuccinimide for the N-bromoacetamide in the foregoing reaction is productive of the corresponding 9α-iodo product, 6α-fluoro-9α-iodo-11β,17α-dihydroxy-21-acetoxy-4-pregnene-3,20-dione.

PREPARATION 13

6α-fluoro-9β,11β-oxido-17α-hydroxy-21-acetoxy-4-pregnene-3,20-dione

A mixture of 2.816 grams of 6α-fluoro-9α-bromo-11β,17α-dihydroxy-21-acetoxy-4-pregnene-3,20-dione (6α-fluoro-9α-bromohydrocortisone acetate), from Preparation 12, 2.816 grams of potassium acetate, and ninety milliliters of acetone was stirred and heated at reflux temperature for eighteen hours. The reaction mixture was then concentrated to about one-half the original volume and cooled in an ice bath. Addition of 250 milliliters of water gave 2.264 grams of 6α-fluoro-9β,11β-oxido-17α-hydroxy-21-acetoxy-4-pregnene-3,20-dione (IV), melting point 195 to 200 degrees centigrade with decomposition. The analytical sample, recrystallized from acetone, melted at 197 to 200 degrees centigrade. Analysis gave $[\alpha]_D$ plus 28 degrees (acetone) and the following:

Analysis.—Calcd. for $C_{23}H_{29}O_6F$: C, 65.70; H, 6.95; F, 4.52. Found: C, 65.76; H, 7.03; F, 4.24.

PREPARATION 14

6α,9α - difluoro - 11β,17α - dihydroxy - 21 - acetoxy - 4-pregnene - 3,20 - dione (6α,9α - difluorohydrocortisone acetate)

To 3.41 grams of liquid hydrogen fluoride cooled in a dry-ice bath, was added, portion-wise, a slurry of 1.875 grams of 6α-fluoro-9β,11β-oxido-17α-hydroxy-21-acetoxy-4-pregnene-3,20-dione in 5.97 grams of tetrahydrofuran (distilled over NaOH) and twenty millileters of methylene chloride which had similarly been cooled in a dry-ice bath. The steroid dissolved completely. After standing at zero to five degrees centigrade for seventeen hours, the reaction mixture was poured slowly into a stirred mixture of 300 milliliters ice-water, fifty milliliters of methylene chloride, and twenty grams of sodium bicarbonate. The mixture was stirred for a few minutes, the methylene chloride layer was separated and the water phase extracted with two fifty-milliliter portions of fresh methylene chloride. The combined methylene chloride solutions were washed with water and dried. Attempts to crystallize the product by addition of Skellysolve B hexanes gave only oil. The oil was again dissolved by addition of methylene chloride and chromatographed over synthetic magnesium silicate. One long fraction of 1.496 grams came down from the column, which according to the papergram consisted of four materials in the ratio of 5:25:65:5. This fraction gave crystalline fractions of material upon cooling.

All of the crystallization fractions were combined and the whole column fraction was acetylated overnight with ten milliliters of acetic anhydride in ten milliliters of pyridine. The acetylation mixture was poured into ice-water and extracted with methylene chloride. The extract was washed with dilute acid, dilute base, water, dried and put over a synthetic magnesium silicate column. A papergram of this crude material showed two spots in the ratio of 20:80. The fraction weighing 1.075 gram, eluted from the column with fifteen and twenty percent acetone in Skellysolve B hexanes, was recrystallized several times from different solvents and gave 180 milligrams of constant melting product, 6α,9α-difluoro-11β,17α-dihydroxy-21-acetoxy-4-pregnene-3,20-dione, melting point 220 to 225 degrees centigrade. Analysis gave $[\alpha]_D$ plus 115 degrees (acetone) and the following:

Analysis.—Calcd. for $C_{23}H_{30}O_6F_2$: C, 62.71; H, 6.87; F, 8.63. Found: C, 62.85; H, 7.22; F, 8.67.

Substitution of aqueous hydrogen chloride for the hydrogen fluoride above is productive of the corresponding 9α - chloro product, 6α - fluoro - 9α-chloro-11β,17α-dihydroxy-21-acetoxy-4-pregnene-3,20-dione.

PREPARATION 15

6α,9α-difluoro-11β,17α,21-trihydroxy-4-pregnene-3,20-dione (6α,9α-difluorohydrocortisone)

Nitrogen was bubbled through a solution of 0.33 gram of 6α,9α - difluoro-11β,17α-dihydroxy-21-acetoxy-4-pregnene-3,20-dione (6α,9α-difluorohydrocortisone acetate) in 33 milliliters of methanol for fifteen minutes. To this was added a solution of 0.33 gram of potassium bicarbonate in four milliliters of water likewise treated with nitrogen. After stirring under nitrogen for five hours, the base was neutralized by the addition of 2.5 milliliters of five percent hydrochloric acid. The mixture was then concentrated under reduced pressure at fifty degrees centigrade to about five milliliters. The residue was taken up in ethyl acetate, washed, dried and evaporated to dryness. Crystallization from acetone-Skellysolve B hexanes yielded 0.27 gram of 6α,9α-difluoro-11β,17α,21-trihydroxy-4-pregnene-3,20-dione (6α,9α - difluorohydrocortisone), melting point 210 to 218 degrees centigrade. The analytical sample melted at 214 to 217 degrees centigrade. Analysis gave $[\alpha]_D$ plus 115 degrees (acetone) and the following:

Analysis.—Calcd. for $C_{21}H_{28}O_5F_2$: C, 63.30; H, 7.08; F, 9.54. Found: C, 63.60; H, 7.39; F, 8.48.

In the same manner hydrolysis of 6α-fluoro-9α-chloro-11β,17α-dihydroxy-21-acetoxy-4 - pregnene - 3,20 - dione with potassium bicarbonate in aqueous methanol under nitrogen yields 6α - fluoro - 9α - chloro-11β,17α,21-trihydroxy-4-pregnene-3,20-dione and 6α - fluoro - 9α - bromo-11β,17α-dihydroxy-21-acetoxy-4 - pregnene - 3,20 - dione yields 6α - fluoro-9α-bromo-11β,17α,21-trihydroxy-4-pregnene-3,20-dione.

PREPARATION 16

6α,9α-difluoro-17α-hydroxy-21-acetoxy-4-pregnene-3,11,20-trione (6α,9α-difluorocortisone acetate)

A solution was prepared containing 0.5 gram of 6α,9α-difluoro-11β,17α-dihydroxy-21-acetoxy-4-pregnene - 3,20-dione (6α,9α-difluorohydrocortisone), 0.15 gram of chromium trioxide, ten milliliters of glacial acetic acid and one-half milliliter of water. This mixture was stirred and maintained at room temperature for eight hours. Thereafter, excess oxidant is destroyed by the addition of methanol and the mixture was poured into fifty milliliters of ice water and the thus obtained precipitate collected on a filter and recrystallized three times from ethyl acetate and Skellysolve B hexanes to give 6α,9α-difluoro-17α-hydroxy-21-acetoxy-4-pregnene-3,11,20-trione.

In the same manner 6α-fluoro-9α-chloro-11β,17α-dihydroxy-21-acetoxy-4 - pregnene - 3,20 - dione oxidized with chromium trioxide in acetic acid yielded 6α-fluoro-9α-chloro-17α-hydroxy - 21 - acetoxy - 4 - pregnene - 3,11,20-trione and 6α - fluoro - 9α - bromo-11β,17α-dihydroxy-21-acetoxy-4-pregnene-3,20-dione yielded 6α-fluoro-9α-bromo-17α-hydroxy-21-acetoxy-4-pregnene-3,11,20-trione.

PREPARATION 17

6α,9α-difluoro-17α,21-dihydroxy-4-pregnene-3,11,20-trione (6α,9α-difluorocortisone)

Following the procedure of Preparation 15 but substituting 6α,9α-difluorocortisone acetate as the starting material therein is productive of 6α,9α-difluorocortisone. Similarly, substituting 6α-fluoro-9α-chloro-17α-hydroxy-21-acetoxy-4-pregnene-3,11,20-trione is productive of 6α-fluoro-9α-chloro-17α,21-dihydroxy-4-pregnene - 3,11,-20-trione and 6α - fluoro-9α-bromo-17α-hydroxy-21-acetoxy-4-pregnene-3,11,20-trione is productive of 6α-fluoro-9α-bromo-17α,21-dihydroxy-4-pregnene-3,11,20-trione.

PREPARATION 18

6α-fluoro-9α-bromo-11β,17α,21-trihydroxy-4-pregnene-3,20-dione (6α-fluoro-9α-bromo-hydrocortisone)

Following the procedure of Preparation 15, substitution of 6α-fluoro-9α-bromohydrocortisone acetate from Preparation 12 for 6α,9α-difluorohydrocortisone acetate is productive of 6α-fluoro-9α-bromohydrocortisone. Alternatively the removal of the acetyl radical from 6α-fluoro-9α-bromohydrocortisone acetate to produce 6α-fluoro-9α-bromohydrocortisone is accomplished under acid conditions, such as, for example, methanolic hydrochloric acid.

PREPARATION 19

6β-epimers

Substituting the 6β - fluoro-11β,17α-dihydroxy-21-acetoxy - 4 - pregnene - 3,20 - dione (6β-fluorohydrocortisone acetate) from Preparation 8 as the starting material in Preparation 10 and maintaining near neutral reaction conditions throughout, there is produced by the procedures of Preparations 10 through 18 the corresponding 6β-epimers.

EXAMPLE 1

*6α,9α-difluoro-11β,17α,21-trihydroxy-4-pregnene-3,20-dione 21-methanesulfonate (II)*

To a solution of 500 milligrams of 6α,9α-difluoro-11β,17α,21-trihydroxy-4-pregnene-3,20-dione (I) in six milliliters of pyridine previously cooled to zero to five degrees centigrade was added 0.55 milliliter of methanesulfonyl chloride. The reaction mixture was stirred at six degrees centigrade for sixteen hours and then poured into 100 milliliters of cold five percent hydrochloric acid solution. The resulting solid mesylate, 6α,9α-difluoro-11β,17α,21-trihydroxy-4-pregnene-3,20-dione 21-methanesulfonate, after being filtered, washed with water and dried, weighed 620 milligrams.

EXAMPLE 2

*6α,9α-difluoro-11β,17α-dihydroxy-21-iodo-4-pregnene-3,20-dione (III) and 6α,9α-difluoro-11β,17α-dihydroxy-4-pregnene-3,20-dione (IV)*

To a solution of 370 milligrams of crude 6α,9α-difluoro-11β,17α,21-trihydroxy-4-pregnene-3,20-dione 21-methanesulfonate (II) in ten milliliters of acetone was added a solution of 370 milligrams of sodium iodide in four milliliters of acetone. The mixture was stirred at room temperature for twenty minutes and at reflux for fifteen minutes and was then evaporated to dryness at reduced pressure. The residue containing 6α,9α-difluoro-11β,17α-dihydroxy-21-iodo-4-pregnene-3,20-dione (III) was dissolved in five milliliters of acetic acid and stirred for 45 minutes. A solution of 600 milligrams of sodium thiosulfate in 7.2 milliliters of water was added to the acetic acid solution, followed by seventy milliliters of ice and water was added. The resulting solid, isolated by filtration, weighed 185 milligrams and was chromatographed over synthetic magnesium silicate and crystallized from acetone-Skellysolve B hexanes mixture to give 137 milligrams of 6α,9α-difluoro-11β,17α-dihydroxy-4-pregnene-3,20-dione (IV), melting at 220 to 240 degrees centigrade. An additional 59 milligrams of product melting at 200 to 220 degrees centigrade was obtained by extracting the water phase from the above precipitation step with methylene chloride, followed by chromatographing and crystallizing as above. The total crystalline material was recrystallized several times from ethyl acetate to give an analytical sample which melted at 253 to 256 degrees centigrade. Analysis gave [α]$_D$ plus 109 degrees (acetone) and the following:

*Analysis.*—Calcd. for $C_{21}H_{28}O_4F_2$: C, 65.95; H, 7.38; F, 9.94. Found: C, 66.26; H, 7.49; F, 9.10.

Alternatively, the 6α,9α-difluoro-11β,17α-dihydroxy-21-iodo-4-pregnene-3,20-dione (III) can be purified by recrystallization from methylene chloride.

EXAMPLE 3

*6α,9α-difluoro-17α-hydroxy-4-pregnene-3,11,20-trione (V)*

A solution was prepared containing 0.5 gram of 6α,9α-difluoro-11β,17α-dihydroxy-4-pregnene-3,20-dione (IV), 0.15 gram of chromium trioxide, ten milliliters of glacial acetic acid and one-half milliliter of water. This mixture was stirred and maintained at room temperature for eight hours. Thereafter excess oxidant was destroyed by the addition of methanol and the mixture was poured into fifty milliliters of ice water. The thus precipitated 6α,9α-difluoro-17α-hydroxy-4-pregnene-3,11,20-trione (V) was collected on a filter, washed with water, and dried.

Alternatively, starting with 6α,9α-difluoro-17α,21-dihydroxy-4-pregnene-3,11,20-trione from Preparation 17 and reacting this with methanesulfonyl chloride to produce the 21-methanesulfonate, then treating the 21-methanesulfonate with sodium iodide in acetone to produce the 21-iodide, and treating the 21-iodide with sodium thiosulfate, as shown in Examples 1 and 2, is productive of 6α,9α-difluoro-17α-hydroxy-4-pregnene-3,11,20-trione (V).

EXAMPLE 4

*6α-fluoro-9α-chloro-11β,17α-dihydroxy-4pregnene-3,20-dione and 6α-fluoro-9α-bromo-11β,17α-dihydroxy-4-pregnene-3,20-dione*

In the same manner given in Examples 1 and 2, reacting in pyridine solution 6α-fluoro-9α-chloro-11β,17α,21-trihydroxy-4-pregnene-3,20-dione, from Preparation 15, with methanesulfonyl chloride, reacting the thus produced 21-methanesulfonate with sodium iodide in acetone to produce the 21-iodide, and reducing the 21-iodide with aqueous sodium thiosulfate is productive of 6α-fluoro-9α-chloro-11β,17α-dihydroxy-4-pregnene-3,20-dione. Similarly, starting with 6α-fluoro-9α-bromo-11β,17α,21-trihydroxy-4-pregnene-3,20-dione is productive of 6α-fluoro-9α-bromo-11β,17α-dihydroxy-4-pregnene-3,20-dione.

EXAMPLE 5

*6α-fluoro-9α-chloro-17α-hydroxy-4-pregnene-3,11,20-trione and 6α-fluoro-9α-bromo-17α-hydroxy-4-pregnene-3,11,20-trione*

In the same manner given in Example 3, reacting 6α-fluoro-9α-chloro-11β,17α-dihydroxy-4-pregnene-3,20-dione with chromium trioxide in acetic acid and water is productive of 6α-fluoro-9α-chloro-17α-hydroxy-4-pregnene-3,11,20-trione. Similarly, starting with 6α-fluoro-9α-bromo-11β,17α-dihydroxy-4-pregnene-3,20-dione is productive of 6α-fluoro-9α-bromo-17α-hydroxy-4-pregnene-3,11,20-trione. Alternatively, starting with 6α-fluoro-9α-chloro-17α,21-dihydroxy-4-pregnene-3,11,20-trione from Preparation 16 and reacting this with methanesulfonyl chloride to produce the 21-methanesulfonate, then treating the 21-methanesulfonate with sodium iodide in acetone to produce the 21-iodide, and treating the 21-iodide with sodium thiosulfate as shown in Examples 1 and 2, is productive of 6α-fluoro-9α-chloro-17α-hydroxy-4-pregnene-3,11,20-trione. Similarly, starting with 6α-fluoro-9α-bromo-17α,21-dihydroxy-4-pregnene-3,11,20-trione is productive of 6α-fluoro-9α-bromo-17α-hydroxy-4-pregnene-3,11,20-trione.

EXAMPLE 6

*6β-epimers*

Substituting 6β,9α-difluoro-11β,17α,21-trihydroxy-4-pregnene-3,20-dione (6β,9α-difluorohydrocortisone) for the starting material in Example 1 and retaining the 6β-configuration in subsequent steps by careful maintenance of near neutral reaction conditions, 6β-epimers, such as 6β,9α-difluoro-11β,17α-dihydroxy-21-desoxy-4-pregnene-3,20-dione, 6β-fluoro-9α-chloro-11β,17α-dihydroxy-21-desoxy-4-pregnene-3,20-dione, 6β-fluoro-9α-bromo-11β,17α-dihydroxy-21-desoxy-4-pregnene-3,20-dione, 6β,9α-difluoro-17α-hydroxy-21-desoxy-4-pregnene-3,11,20-trione, 6β-fluoro-9α-chloro-17α-hydroxy-21-desoxy-4-pregnene-3,11,20-trione and 6β-fluoro-9α-bromo-17α-hydroxy-21-desoxy-4-pregnene-3,11,20-trione are produced, which can be isolated from the reaction mixture. The thus obtained 6β-epimers yield the 6α-epimers by treatment with an acid or base in an organic solvent.

It is to be understood that the invention is not be limited to the exact details of operation or exact compounds shown and described, as obvious modifications and equivalents will be apparent to one skilled in the art. The invention is therefore to be limited only by the scope of the appended claims.

We claim:

1. A compound selected from the group consisting of 6-fluoro-9α-halo-21-desoxyhydrocortisone and 6-fluoro-9α-halo-21-desoxycortisone, wherein the 9α-halogen atom is of atomic weight between seventeen and eighty, inclusive.

2. A compound selected from the group consisting of 6α-fluoro-9α-halo-21-desoxyhydrocortisone and 6α-fluoro-9α-halo-21-desoxycortisone, wherein the 9α-halogen atom is of atomic weight between seventeen and eighty, inclusive.

3. 6α-fluoro-9α-halo-21-desoxyhydrocortisone, wherein the 9α-halogen is of atomic weight between seventeen and eighty, inclusive.
4. 6α,9α-difluoro-21-desoxyhydrocortisone.
5. 6α-fluoro-9α-chloro-21-desoxyhydrocortisone.
6. 6α-fluoro-9α-bromo-21-desoxyhydrocortisone.
7. 6α-fluoro-9α-halo-21-desoxycortisone, wherein the 9α-halogen is of atomic weight between seventeen and eighty, inclusive.
8. 6α,9α-difluoro-21-desoxycortisone.
9. 6α-fluoro-9α-chloro-21-desoxycortisone.
10. 6α-fluoro-9α-bromo-21-desoxycortisone.
11. A compound of the formula

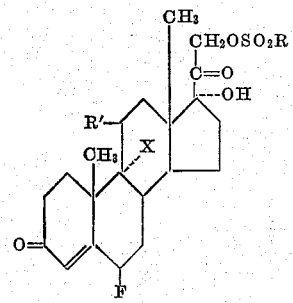

wherein R is a hydrocarbon radical containing from one to ten carbon atoms, inclusive, R' is a member selected from the group consisting of hydroxy and keto, and X is a halogen of atomic weight between seventeen and eighty, inclusive.

12. 6α,9α-difluoro-11β,17α,21-trihydroxy - 4 - pregnene-3,20-dione 21-methansulfonate.
13. A compound of the formula

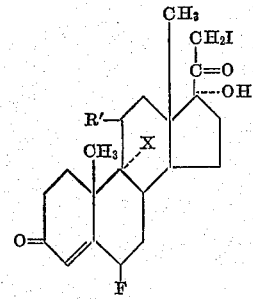

wherein R' is a member selected from the group consisting of hydroxy and keto, and X is a halogen of atomic weight between seventeen and eighty, inclusive.

14. 6α,9α - difluoro - 11β,17α - dihydroxy - 21 - iodo-4-pregnane-3,20-dione.
15. A process for the production of 6-fluoro-9α-halo steroids which comprises: treating a compound of the formula

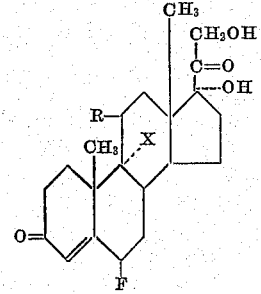

wherein R is a member selected from the group consisting of hydroxy and keto and X is a halogen of atomic weight between seventeen and eighty, inclusive, with an organic sulfonyl halide to produce the corresponding 21-organic acid sulfonate, reacting the said 21-organic sulfonate with an iodinating agent to produce the corresponding 21-iodo steroid, and reacting the said 21-iodo steriod with a reducing agent to produce the corresponding 21-desoxy steroid.

16. A process for the production of 6-fluoro-9 -halo-21-desoxyhydrocortisone which comprises: treating 6-fluoro-9α-halohydrocortisone with an organic sulfonyl halide to produce the corresponding 21-organic acid sulfonate, reacting the said 21-organic acid sulfonate with an iodinating agent to produce 6-fluoro-9α-halo-21-iodo-21-desoxyhydrocortisone, and reacting the said 21-iodo-21-desoxyhydrocortisone with a reducing agent to produce 6-fluoro-9α-halo-21-desoxyhydrocortisone.

17. A process for the production of 6α-fluoro-9α-halo-21-desoxyhydrocortisone, wherein the halogen is of atomic weight seventeen to eighty, inclusive, which comprises: treating 6α-fluoro-9α-halohydrocortisone with methane-sulfonyl chloride to produce the 21-methanesulfonate, reacting the said 6α-fluoro-9α-halohydrocortisone 21-methane-sulfonate with sodium iodide to produce 6α-fluoro-9α-halo-21-iodo-21-desoxyhydrocortisone, and reacting the said 21-iodo compound with sodium thiosulfate, to produce 6α-fluoro-9α-halo-21-desoxyhydrocortisone.

18. A process for the production of 6α,9α-difluoro-21-desoxyhydrocortisone which comprises: treating 6α,9α-difluorohydrocortisone with methanesulfonyl chloride to produce the 21-methanesulfonate, treating the said 6α,9α-difluorohydrocortisone 21-methanesulfonate with sodium iodide to give 6α,9α - difluoro-21-iodo-21-desoxyhydrocortisone, and reacting the said 21-iodo compound with sodium thiosulfate to produce 6α,9α-difluoro-21-desoxyhydrocortisone.

19. A process for the production of 6-fluoro-9α-halo-21-desoxycortisone, wherein the halogen is of atomic weight seventeen to eighty, inclusive, which comprises: treating 6-fluoro-9α-halohydrocortisone with an organic sulfonyl halide to produce the corresponding 21-organic acid sulfonate, reacting the said 21-organic acid sulfonate with an iodinating agent to give 6-fluoro-9α-halo-21-iodo-21-desoxyhydrocortisone, reacting the said 21-iodo compound with a reducing agent to give 6-fluoro-9α-halo-21-desoxyhydrocortisone, and reacting the said 6-fluoro-9α-halo-21-desoxyhydrocortisone with an oxidizing agent to produce 6-fluoro-9α-halo-21-desoxycortisone.

20. A process for the production of 6α-fluoro-9α-halo-21-desoxycortisone, wherein the halogen is of atomic weight seventeen to eighty, inclusive, which comprises: treating 6α-fluoro-9α-halo-21-desoxyhydrocortisone with methanesulfonyl chloride to produce the 21-methanesulfonate, reacting the said 21-methanesulfonate with sodium iodide to produce 6α-fluoro-9α-halo-21-iodo-21-desoxyhydrocortisone, reacting the said 21-iodo compound with sodium thiosulfate to produce 6α-fluoro-9α-halo-21-desoxyhydrocortisone, and reacting the said 6α-fluoro-9α-halo-21-desoxyhydrocortisone with chromium trioxide to produce 6α-fluoro-9α-halo-21-desoxycortisone.

21. A process for the production of 6α,9α-difluoro-21-desoxycortisone which comprises: treating 6α,9α-difluorohydrocortisone with methanesulfonyl chloride to produce the 21-methanesulfonate, reacting the said 21-methanesulfonate with sodium iodide to produce 6α,9α-difluoro-21-iodo-21-desoxyhydrocortisone, reacting the said 6α,9α-difluoro-21-iodo-21-desoxyhydrocortisone with sodium thiosulfate to produce 6α,9α-difluoro-21-desoxyhydrocortisone, and reacting the said 6α,9α-difluoro-21-desoxyhydrocortisone with chromium trioxide to produce 6α,9α-difluoro-21-desoxycortisone.

22. A process for the production of 6-fluoro-9α-halo-21-desoxyhydrocortisone which comprises: reacting 6-fluoro-9α-halo-21-iodo-21-desoxyhydrocortisone with a reducing agent.

23. A process for the production of 6α,9α-difluoro-21-desoxyhydrocortisone which comprises: reacting 6α,9α-difluoro-21-iodo-21-desoxyhydrocortisone with an alkali metal thiosulfate.

No references cited.